Jan. 18, 1966  V. ECKHARDT  3,229,881
STRIP STOCK FEEDING MECHANISM WITH TENSIONING MEANS
Filed Oct. 14, 1963  2 Sheets-Sheet 1

INVENTOR
Vilem Eckhardt
By Dike & Craig
ATTORNEYS

Jan. 18, 1966 V. ECKHARDT 3,229,881
STRIP STOCK FEEDING MECHANISM WITH TENSIONING MEANS
Filed Oct. 14, 1963 2 Sheets-Sheet 2

INVENTOR
Vilem Eckhardt
By Dicke & Craig
ATTORNEYS

United States Patent Office 3,229,881
Patented Jan. 18, 1966

3,229,881
STRIP STOCK FEEDING MECHANISM
WITH TENSIONING MEANS
Vilem Eckhardt, Paris, France, assignor to Driam Société
Anonyme, Vaduz, Liechtenstein
Filed Oct. 14, 1963, Ser. No. 316,076
Claims priority, application Germany, Oct. 17, 1962,
D 40,083
4 Claims. (Cl. 226—195)

The present invention relates to a method and apparatus for feeding strip stock by means of feed rollers, for example, to a pipe making machine.

Although it is very desirable, especially for producing welded longitudinal-seam or helical-seam pipes, to provide strip stock with straight longitudinal edges, this is hardly ever possible. In most cases, the strip to be used is curved like a saber at one side, more rarely also on both sides. The difference between the lengths of the two longitudinal edges often amounts, for example, to 6 mm. and more per meter. When forming the strip into a welded helical seam pipe, these differences in length result in a very unsteady movement of the strip in the forming tool and in radial tensions in the weld which in extreme cases may lead to fissures and defects at the inside of the weld. In order to compensate for irregularities in the feeding movement of the strip stock, it has therefore previously been necessary to examine and control very carefully the width and condition of the welding seam. While in pipes of a relatively small diameter the differences in length between the edges of the strip are of minor importance and may be compensated by a careful control, they may in the production of pipes of a relatively large diameter lead to inadmissible variations in diameter.

It is an object of the present invention to overcome these difficulties. For this purpose, it is the basic concept of the invention to apply upon the strip stock at a certain distance before reaching the feed rollers which convey it to the pipe making machine a braking action or drag which is exerted across the width of the strip and the force of which acts in the longitudinal direction of the strip. This is especially applicable as long as the difference in length of the longitudinal edges of the strip is relatively small. This braking action or drag is preferably exerted by means of a plate consisting of one or more parts which is pressed transversely upon the strip on a solid base. The pressure upon the plate or plates and its distribution thereon is preferably variable.

If the difference in length between the two edges of the strip exceeds a certain value, the longer edge will curve upwardly in the area between the brake and the feed rollers. In order to insure that the traction which is exerted by the feed rollers upon the strip will act upon the latter so that beyond the feed rollers, as seen in the feeding direction, the strip will run straight, the invention further provides that in the area between the brake surface and the feed rollers or between two brake surfaces the strip should be raised or lowered from its normal plane of movement. This raising or lowering may be effected by a support such as a rod or the like, the effective height of which is adjustable and which automatically adjusts itself to inclined positions and extends transverse to the longitudinal direction of the strip. This support may be either pivotable about an axis which is located above or below its longitudinal axis and extends transverse to this axis or the opposite ends of the support may be pivotably connected to a pair of pistons which are slidable in cylinders each of which is connected to one end of a communicating pipe. The liquid contained in this pipe is subjected to a static pressure. It is further advisable to provide control means which are associated with the support and adapted to vary the pressure upon the feed rollers so that the contact pressure of the feed rollers near the lowest edge of the strip will be higher than near the other edge. In this manner it is possible to stretch the shorter edge of the strip if this should become necessary.

The features and advantages of the present invention will become more clearly apparent from the following detailed description thereof which is to be read with reference to the accompanying diagrammatic drawings, in which—

FIGURE 6 shows a side view of the feeding mechanism according to FIGURE 3; while

Figure 1:
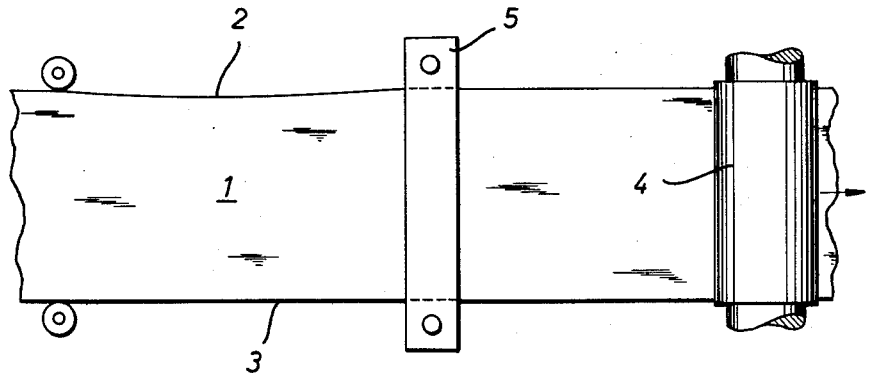
FIGURE 1 shows a plan view of a feeding mechanism including a brake in front of the feed rollers for feeding the strip stock to a pipe making machine.

According to FIGURE 1 of the drawings, a strip 1 which has a longitudinal edge 2 of greater length than the other longitudinal edge 3 is to be fed by a pair of superimposed feed rollers 4 in the direction toward a pipe forming tool, not shown. Since FIGURE 1 is a plan view, it is apparent from the shape of the longitudinal edge 2 that this edge extends to a higher level than the other longitudinal edge 3. According to the invention, strip 1 is dragged by the feed rollers 4 through a brake which comprises a transverse plate 5 which presses the strip 1 against a support, not shown. If the pressure which is exerted by this brake upon the strip 1 is sufficient, the latter will be forced to extend within a level plane between plate 5 and feed rollers 4 and the longitudinal edges of this part of the strip will be parallel to each other. The difference in length between the two longitudinal edges of the strip and the corresponding deformation thereof, will thus be held back by the brake plate 5, and transferred to the area of the strip behind this plate.

Figure 2:
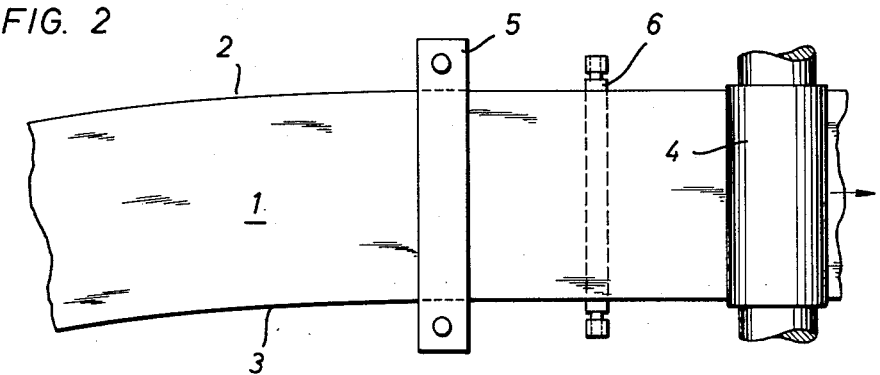
FIGURE 2 shows a plan view of a feeding mechanism which is similar to that according to FIGURE 1, but additionally provided with a support acting upon the strip between the brake and the feed rollers.
Figure 4:
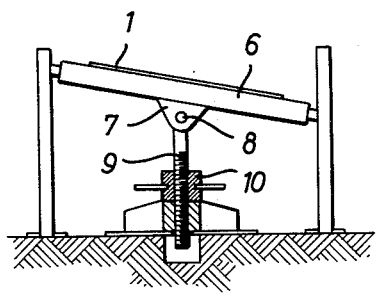
FIGURE 4 shows a front view of a support which is self-adjustable to inclined positions and is pivotable about an axis extending in the direction of travel of the strip.

If there is a danger that the difference in length between the edges of the strip is so large that the strip will be deformed also between the brake plate 5 and the feed rollers 4 and that the longer edge of this part of the strip will therefore be raised because the braking force to be applied upon the strip cannot be made so great that this difference in length will be compensated since the strip might otherwise be damaged or even torn, the invention further provides that between the brake plate 5 and the feed rollers 4 a support 6 be placed as shown in FIGURE 2, which adapts itself to the inclined position of the strip within this area. The strip which is conveyed by the feed rollers 4 exerts a static pressure upon this support which should be adjustable to different heights. As illustrated in FIGURE 4, the support 6 may be provided with a forkhead 7 which is pivotally connected by a pivot pin 8 or the like to a vertically adjustable member 9 which may consist, for example, of a bolt which is screwed into a bearing member 10.

Figure 5:
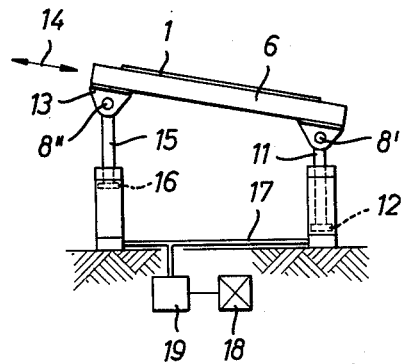
FIGURE 5 shows a front view of a support which is adjustable to inclined positions and is pivotably mounted on two pistons which are movable in cylinders which are connected by a communicating tube.

A modification of this support is illustrated in FIGURE 5, in which the support 6 is pivotably connected at one end by means of a pivot pin 8' or the like to a piston rod 11 of a piston 12 which is slidable in a cylinder. The other end of the support 6 is provided with a slide member 13 which is slidable relative to the support 6 in the direction of the arrow 14 and pivotably connected by a pivot pin 8" or the like to a piston rod 15 of a piston 16 which is also slidable in a cylinder. The cylinder chambers underneath pistons 12 and 16 are connected by a communicating pipe 17 containing a liquid which may be subjected to a static pressure by a pump 19 which is driven by a motor 18.

Figure 3:
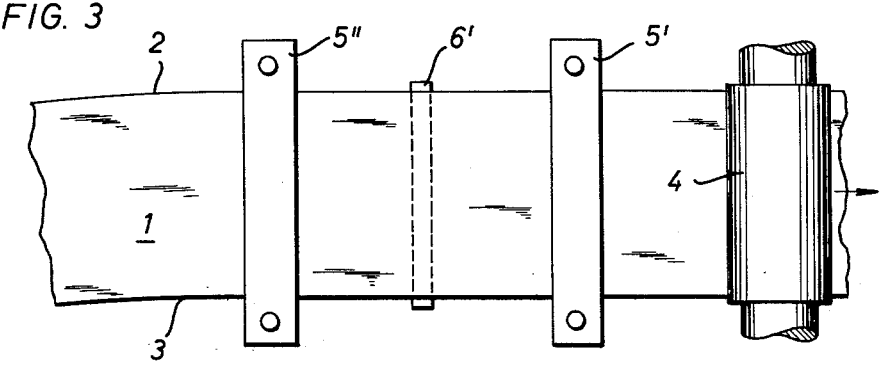
FIGURE 3 shows a plan view of a further modification of the feeding mechanism which is provided with two brakes and a support between them which is adjustable to inclined positions.

According to a further modification of the invention as shown in FIGURE 3, two brakes 5' and 5" are provided at the rear of the feed rollers 4 and a support 6' is mounted between these two brakes. Brakes 5' and 5" and support 6' act in the same manner as described with reference to FIGURES 1, 4, and 5. This arrangement has the advantage that the specific surface pressure of each individual brake may be lower than the specific surface pressure of the brakes according to FIGURES 1 and 2. Thus, while in the arrangement according to FIGURE 2 the longer edge of the strip is raised between the feed rollers 4 and the brake plate 5, this is raised in the arrangement according to FIGURE 3 between the two brake plates 5' and 5".

Figure 6:
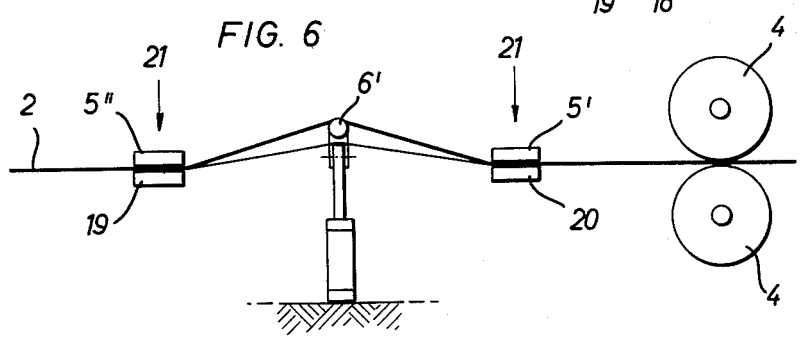

As illustrated in FIGURE 6, the strip 2 is supported underneath each brake plate by a solid base 19 or 20 so that the associated brake plate can exert the required braking force which is indicated by the arrows 21. Each brake plate is preferably acted upon by one or more hydraulic pistons so as to permit the braking force to be held constant or to changed.

Figure 7:
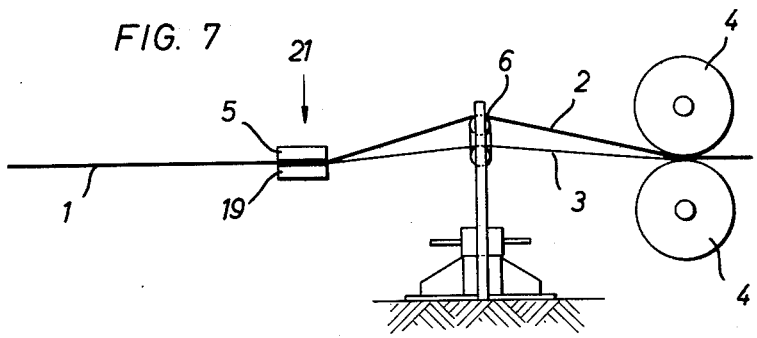
FIGURE 7 shows a side view of the feeding mechanism according to FIGURE 2.

FIGURE 7 illustrates the manner in which the strip 1 is deformed between the feed rollers 4 and the brake plate 5 or similarly between the brake plates 5' and 5" as shown in FIGURE 6. The strip edges 2 and 3 are raised to a higher level than that of the general feeding plane of the strip which is determined by the elevation of the bases 19 and 20 of one or several brakes and the feed rollers 4.

If the feeding mechanism according to the invention is to be employed in connection with a pipe making machine for producing conical pipes, it is, of course, also possible to operate with the above-mentioned means in such a manner that, even though an existing distortion of the strip is substantially eliminated, a certain difference in length between the two longitudinal edges is allowed to remain.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for feeding strip stock to a machine producing helical-seam pipes, said apparatus comprising a pair of feed rollers acting upon the opposite sides of a strip to feed said strip, at least one pressure plate at one side of and extending tranverse to said strip in front of said feed rollers, a stationary support at the other side of said strip opposite to said pressure plate, and means for pressing said pressure plate upon a transverse surface of said strip and the latter against said support, an element extending tranversely of said strip intermediate said pressure plate and said feed rollers for supporting said strip, means for permitting said element to adjust itself to inclined positions under the action of said strip, and means for adjusting the effective height of said element, said means for permitting said element to adjust itself comprising a pair of cylinders, a piston slidable in each cylinder and having a piston rod, means for pivotably connecting said piston rods to the opposite ends of said element, a hydraulic line connecting said cylinders to each other at one side of said pistons, and means for subjecting the liquid in said line to a static pressure.

2. An apparatus for feeding strip stock to a machine producing helical-seam pipes, said apparatus comprising a pair of feed rollers acting upon the opposite sides of a strip to feed said strip, a pair of pressure plates spaced from each other at one side of and extending transverse to said strip in front of said feed rollers, at least one stationary support at the other side of said strip opposite to said pressure plates, and means for pressing said pressure plates upon transverse surfaces of said strip and the latter against said support, an element extending transversely of said strip intermediate said pressure plate and said feed rollers for supporting said strip, means for permitting said element to adjust itself to inclined positions under the action of said strip, said means for permitting said element to adjust itself comprising a pair of cylinders, a piston slidable in each cylinder and having a piston rod, means for pivotably connecting said piston rods to the opposite ends of said element, a hydraulic line connecting said cylinders to each other at one side of said pistons, and means for subjecting the liquid in said line to a static pressure.

3. An apparatus for feeding strip stock to a machine producing helical-seam pipes, said apparatus comprising a pair of feed rollers acting upon the opposite sides of a strip to feed said strip, at least one pressure plate at one side of and extending transverse to said strip in front of said feed rollers, a stationary support at the other side of said strip opposite to said pressure plate, and means for pressing said pressure plate upon a transverse surface of said strip and the latter against said support, an element extending transversely of said strip intermediate said pressure plate and said feed rollers for supporting said strip, means for permitting said element to adjust itself to inclined positions under the action of said strip, and means for adjusting the effective height of said element, said means for permitting said element to adjust itself to inclined positions comprising means connecting said element and said adjusting means, said connecting means comprising pivot means having a pivot axis disposed transverse to and below said element.

4. An apparatus for feeding strip stock to a machine producing helical-seam pipes, said apparatus comprising a pair of feed rollers acting upon the opposite sides of a strip to feed said strip, a pair of pressure plates spaced from each other at one side of and extending transverse to said strip in front of said feed rollers, at least one stationary support at the other side of said strip opposite to said pressure plates, and means for pressing said pressure plates upon transverse surfaces of said strip and the latter against said support, an element extending transversely of said strip intermediate said pressure plates for supporting said strip, means for permitting said element to adjust itself to inclined positions under the action of said strip, and means for adjusting the effective height of said element, said means for permitting said element to adjust itself to inclined positions comprising means connecting said element and said adjusting means, said connecting means comprising pivot means having a pivot axis disposed transverse to and below said element.

References Cited by the Examiner

UNITED STATES PATENTS

| | | | |
|---|---|---|---|
| 1,386,813 | 8/1921 | Townsend | 242—75.2 |
| 2,666,598 | 1/1954 | Robinette | 226—23 X |
| 2,991,921 | 7/1961 | Axon | 226—199 |
| 3,106,365 | 10/1963 | Karr | 226—199 X |
| 3,107,036 | 10/1963 | Richards | 226—198 |

FOREIGN PATENTS 834,014   5/1960   Great Britain.

M. HENSON WOOD, JR., *Primary Examiner.*

RAPHAEL M. LUPO, ROBERT B. REEVES, *Examiners.*